(12) United States Patent
Robinson (10) Patent No.: US 7,685,110 B2
(45) Date of Patent: Mar. 23, 2010

(54) SYSTEM AND METHOD FOR INDUCING USAGE OF INFORMATION SEARCH SYSTEM

(76) Inventor: Andrew Franklin Robinson, P.O. Box 33075, Takapuna (NZ)

( * ) Notice: Subject to any disclaimer, the term of this patent is extended or adjusted under 35 U.S.C. 154(b) by 0 days.

(21) Appl. No.: 11/514,142

(22) Filed: Sep. 1, 2006

(65) Prior Publication Data

US 2007/0083432 A1    Apr. 12, 2007

(51) Int. Cl.
G06F 17/30    (2006.01)
(52) U.S. Cl. .............................. 707/3; 705/14; 705/500
(58) Field of Classification Search .................. 707/3; 705/1, 14, 500
See application file for complete search history.

(56) References Cited

U.S. PATENT DOCUMENTS

| | | | |
|---|---|---|---|
| 5,933,813 A * | 8/1999 | Teicher et al. ................. | 705/26 |
| 6,405,175 B1 * | 6/2002 | Ng ................................ | 705/14 |
| 2002/0072927 A1 * | 6/2002 | Phelan et al. .................. | 705/1 |
| 2002/0076674 A1 * | 6/2002 | Kaplan ......................... | 434/107 |
| 2002/0087400 A1 * | 7/2002 | Khoo et al. ................... | 705/14 |
| 2002/0099605 A1 * | 7/2002 | Weitzman et al. ............. | 705/14 |
| 2002/0107697 A1 * | 8/2002 | Jensen ........................... | 705/1 |
| 2003/0046281 A1 * | 3/2003 | Son ................................ | 707/6 |
| 2003/0093317 A1 * | 5/2003 | Robinson et al. ............. | 705/14 |
| 2003/0233278 A1 * | 12/2003 | Marshall ...................... | 705/14 |
| 2006/0015392 A1 * | 1/2006 | Talla et al. .................... | 705/11 |

* cited by examiner

Primary Examiner—James Trujillo
Assistant Examiner—William Spieler
(74) Attorney, Agent, or Firm—Donn K. Harms

(57) ABSTRACT

An information service includes a network and material on the network provided by an entity. The network provides or is linked to, a request for information elements for submission of a request by the submitter to the entity. Elements are provided to optionally provide an inducement to likely submitters or selected subgroup or subgroups of likely submitters to submit a query.

19 Claims, 10 Drawing Sheets

I already have an xxxxx account and just need the code for an yyyyy

Email
Password

Forgot Password

I'm new to this...

Registration

| | |
|---|---|
| Email address (same as login): | @ .com |
| Choose a password: | ●●●●●●●● |
| Retype password: | ●●●●●●●● |
| First name: | |
| Last name: | |
| If you have a Blog page or Web page address, please enter here: | http:// |
| Occupation (optional): | House-wife, part time sales manager |
| Home country: | United States of America |
| Your main language: | TELUGU |

-30- submit

All information submitted through this site is kept strictly confidential. Please read our privacy policy for more information

☑ Allow users to ask me questions directly (Note: These questions are unfiltered by the          system. By enabling
   this feature, you accept any risks involved. If you are concerning about receiving offensive or abusive queries from users we
   recommend you either charge enough AA$ to deter abusers, or keep this feature disabled.)

○ For free
● For a charge of AA$ [25.00]   ← 33

What is the exchange rate if users wish to buy AA$ to ask you queries
(Note:          take a 12.5% commission).   ← 34

AA$1.00 = US$ [1.00]   ← 35

☐ Give users option to increase the amount of AA$ they pay to contact me

☑ Notify me by email when someone asks me a question directly and offers a minimum price of AA$ [0.00]
☑ AA$1.00 = US$ 1.00
   ○ For free
   ● For a charge of AA$ [5.00]   ← 36

If you are charging AA$ for users to submit queries or mark them private, how many AA$ do you want
new users to have available to begin with?

AA$ [25.00]   ← 37     ☑ Allow voice queries/messages   ← 38

The yyyyy can also distribute AA$ to user when you respond to them.

○ I want to give AA$ [25.00]
● I want to decide how much AA$ to give if/when I respond to a user.   ← 39
○ I never want to give AA$ when I respond to users.

(Optional)
Upload a logo or image   ← 40

● Yes, keep the current one (view).
○ No                                               ← 41
○ Replace the current one with the new one I upload below.

[                    ] [Browse...]      [          ]   ← 42
Which URL would you like this image or logo to link to when clicked? URL

[submit]  ← 43

All information submitted through this site is kept strictly confidential. Please read our privacy policy for more information.

Figure 7

View/Add AA$ to My Existing List of Registered Users
Give AA$ to other xxxxx Members

Figure 8

Step One

Rank My Users

● My yyyyy — 53
○ -select one-
  Cats and Dogs
  Learning Chinese — 54
  African dance  [Submit]

Step Two

| Give AA$ to a user(s) of (yyyyy or Category is displayed here) |
|---|
| Give AA$ [1.00] to this email address (You can comma-separate multiple addresses, for example, mary@thisdomain.com, joe@intermix.com, steve@mailhost.com, etc) |
| [________________]  — 52  [Submit] |

| Rank User domains for users of (yyyyy or Category is displayed here) |
|---|
| In addition to AA$ given to users I've specified above, give an extra AA$ [1.00] to any new user with the following domain suffix (enter suffix after the @, for example, yahoo.com. You can comma-separate multiple domains, for example, thisdomain.com, intermix.com, mailhost.com, etc.) (Why should I give extra to some domains?) |
| @ [________________] — 59 |
| Apart from AA$ given to users specified above, I want to limit start up AA$ to [1.00] for the following domains, IMPORTANT NOTE: The limit only applies to start-up AA$. You can still give AA$ to individual users, even if their email address is from a domain you list below. (Why should I limit start-up $AA?) |
| @ [________________] |
| 60 — [Submit]    view your existing domain rankings |

Figure 9

Enter as many email addresses as you want, comma separated:

Email addresses — Give AA$ [1.00] to the following email addresses...

[Submit]

Page 1 2 3 ▷

| Email Domain Ranking | | |
|---|---|---|
| ID | Email Domain | Initial AA$ |
| 1 | microsoft.com | 400 |
| 2 | google.com | 400 |
| 3 | oracle.com | 400 |
| 4 | nzherald.co.nz | 350 |
| 5 | seanetworldwide.com | 200 |
| 6 | ammas.com | 200 |
| 7 | andrew@woosh.co.nz | 200 |
| 8 | phytomedicine.com.au | 200 |
| 9 | gorealsports.com | 200 |
| 10 | phpublishing.co.uk | 200 |

Click to go back and add more

Step 1) Select ◉ My yyyyy ○ [-Select Category-  
Cats and Dogs  
Learning Chinese  
African dance] —71

Step 2) Give AA$  —70

| You are giving to My | | | | Page 1 2 3 ▷ |
|---|---|---|---|---|
| No. Name | Email | AA$ | Give AA$ | Date |
| 1. Ammas.com, Ltd. | amma@ammas.com | 20 | 0.00 | 16-Jun-05 |
| 2. padma | pa-naath@hotmail.com | 60 | 0.00 | 09-Jun-05 |
| 3. renuka | renud22@yahoo.com | 20 | 0.00 | 27-May-05 |
| 4. prathi | prathi_thangavel@hotmail.com | 20 | 0.00 | 19-Apr-05 |
| 5. priya | pbelhe@yahoo.com | 20 | 0.00 | 27-Feb-05 |
| 6. Lalitha Kannan | lalitha1706@hotmail.com | 20 | 0.00 | 20-Feb-05 |
| 7. rajji | rajji_prabhakar@yahoo.com | 60 | 0.00 | 18-Feb-05 |
| 8. siva | svgn_21@yahoo.com | 45 | 0.00 | 15-Feb-05 |
| 9. Madhuri Survana | madhurisuvarna@gmail.com | 20 | 0.00 | 02-Feb-05 |
| 10. Yashodha | yashoda_m@yahoo.com | 20 | 0.00 | 31-Jan-05 |
| 11. Sakhiya | sakhiya@gmail.com | 20 | 0.00 | 26-Jan-05 |
| 12. SHASHIKALA | moon_kannan@hotmail.com | 20 | 0.00 | 30-Oct-04 |
| 13. komal | vaswani@aol.com | 20 | 0.00 | 25-Sep-04 |
| 14. sheela | shvaswani@aol.com | 20 | 0.00 | 25-Sep-04 |
| 15. Renu Rawat | renulikes2talk@yahoo.com | 20 | 0.00 | 26-Aug-04 |
| 16. sahar zehra | chinka77@rediffmail.com | 60 | 0.00 | 20-Aug-04 |
| 17. akila mohan | akimohan@yahoo.com | 20 | 0.00 | 12-Aug-04 |
| 18. shankar | tami_reader@rediffmail.com | 20 | 0.00 | 03-Aug-04 |
| 19. Tanuja | tanu_r_p@hotmail.com | 20 | 0.00 | 23-Jul-04 |
| 20. Mrs A. Brito | angelob@slingshot.co.nz | 20 | 0.00 | 19-Jul-04 |
| | | | | Page 1 2 3 ▷ —77 |

[submit]

Give AA$ to other Ask Agent members

Give to...

◉ My

○ [-Select Category-  
Cats and Dogs  
Learning Chinese  
African dance]   Select from all [Registered advisors ▽] in   [About Ask Agent  
About Us  
Animals and Pets  
Beauty  
Books  
Business  
Career  
Cars  
Computer Science  
Computers]

You can choose one or more by pressing the CTRL key and clicking all relevant choices   [Submit]

Figure 13

| You are giving to My | | | Page 1 2 3 ▷ |
|---|---|---|---|
| No. Name | AA$ | Give AA$ | Date |
| 1. Ammas.com, Ltd. | 20 | 0.00 | 16-Jun-05 |
| 2. padma | 60 | 0.00 | 09-Jun-05 |
| 3. renuka | 20 | 0.00 | 27-May-05 |
| 4. prathi | 20 | 0.00 | 19-Apr-05 |
| 5. priya | 20 | 0.00 | 27-Feb-05 |
| 6. Lalitha Kannan | 20 | 0.00 | 20-Feb-05 |
| 7. rajji | 60 | 0.00 | 18-Feb-05 |
| 8. siva | 45 | 0.00 | 15-Feb-05 |
| 9. Madhuri Survana | 20 | 0.00 | 02-Feb-05 |
| 10. Yashodha | 20 | 0.00 | 31-Jan-05 |
| 11. Sakhiya | 20 | 0.00 | 26-Jan-05 |
| 12. SHASHIKALA | 20 | 0.00 | 30-Oct-04 |
| 13. komal | 20 | 0.00 | 25-Sep-04 |
| 14. sheela | 20 | 0.00 | 25-Sep-04 |
| 15. Renu Rawat | 20 | 0.00 | 26-Aug-04 |
| 16. sahar zehra | 60 | 0.00 | 20-Aug-04 |
| 17. akila mohan | 20 | 0.00 | 12-Aug-04 |
| 18. shankar | 20 | 0.00 | 03-Aug-04 |
| 19. Tanuja | 20 | 0.00 | 23-Jul-04 |
| 20. Mrs A. Brito | 20 | 0.00 | 19-Jul-04 |
| | | | Page 1 2 3 ▷ |

[submit]

① Enter Query ⇒ ② Authentication ⇒ ③ Confirmation ⇒ ④ Complete Submission

Query submission has not finished...

| Please enter your ID and password... | New Member? click here |
|---|---|
| Enter email address: | |
| Enter password: | (Forgot password?) |
| Submit | |

① Enter Query ⇒ ② Authentication ⇒ ③ Confirmation ⇒ ④ Complete Submission

Confirm Query Submission

| | | | | |
|---|---|---|---|---|
| | Name: | Ammas.com, Ltd | Be anonymous | Congratulations — 107 |
| 101 | Location: | United States of America | | You've |
| | Category: | AskMe | — 102 | been given AA$1.99 by Natasha Pal to start with |
| | Subject: | Testing (change) | | |
| | Query: | Testing your ask me feature. Just having a look (change) | — 103 | Your current balance for Natasha Pal is |

Your current query will be submitted to Natasha Pal ← 104

| | | |
|---|---|---|
| Natasha Pal's fee | | $1.99 |
| Private Query | ○ ON  ● OFF | $0.00 |
| Total cost for this query submission: | | $1.99 |
| Previous Account Balance: | | $1.99 |
| 105 — New Account Balance: | | $0.00 |
| ☑ Allow voice replies | | |

$1.99

After you submit the current query, you will have — 108

$0.00

106

Submit ← 109

100 ⟵ (pointing to form)

Figure 16

| Unanswered queries for me | |
|---|---|
| 08/14/05 | Dear Ma'm, I am 31 years old. I never had bad skin until I turned about 26 yrs old. I have tried it all! Harsh chemicals and dermatologists. I just want to find a skin care regimen that works. I have slightly oily skin after I wash my face and have breakouts on my lower right jawline (poss hormones) I would like recommendations on an entire skin care regimen please. Thanks you so much and have a nice day.<br><br>RACHEL USA |

110 — (table)
111 — RACHEL USA

Headline: ____________________ [?]

Category: Submitted to: AskMe   This query is related to? [AskMe] [?]

Your Response: [B] [I] [U]  [Para]  [URL]  [Favorites]  [Image]  [Stock Responses]

[Tips?]

-112-

🔊 Insert a voice message

If use has selected "I will give AA$ ___ to every user" in the Answer Pod config then that amount is entered in this box. Otherwise it is 0.00. How's that sound?"

Give this user AA$ [ 0.00 ] ———115

☐ I do not want to respond to this query ———113    ┌114
☐ Publish this query/response
☐ Save as Stock Response, and name it [___________]

| I UNDERSTAND THAT BY CLICKING THE SUBMIT BUTTON BELOW, I AM WARRANTING THE FOLLOWING:<br><br>1) This contract binds me in the same way any paper contract binds |
|---|

[Submit]

Figure 17

SYSTEM AND METHOD FOR INDUCING USAGE OF INFORMATION SEARCH SYSTEM

Throughout the description and claims of this specification the word "comprise" and variations of that word, such as "comprises" and "comprising", are not intended to exclude other additives, components, integers or steps.

BACKGROUND OF THE INVENTION

This invention relates to an information service and has been devised particularly though not necessarily solely for providing information over the internet or a local area network.

Online publishers of information such as bloggers and web page publishers can post information and receive comments on their information from viewers to their blog or web page.

The online publishers of information can also post an email address or a form which allows the online user to contact the online publisher of information directly.

However, there remains a need for a system or service that would allow the online publisher of information to sell their expertise and also to provide an inducement to online users to seek information from the online publisher of information.

It is therefore an object of the present invention to provide an information service which will go at least someway towards meeting the foregoing requirement in a simple yet effective manner or which will at least provide the public with a useful choice.

SUMMARY OF THE INVENTION

Accordingly in a first aspect the invention consists in an information service comprising a network, material on the network provided by an entity, the network providing, or being linked to, a request for information means, for submission of a request by the submitter to the entity, and means to optionally provide an inducement to likely submitters or selected subgroup or subgroups of likely submitters to submit a query.

Preferably the inducement comprises a reward.

Preferably the inducement comprises a monetary reward.

Alternatively, the inducement comprises a reward having a non monetary value.

Preferably the service further provides means to enable the entity to charge a fee for response to a request for information.

Preferably the request for information means is provided by a clearing house or service provider.

Preferably the entity can provide further inducements to the submitter of a request for information.

Preferably the network is the internet or a local area network.

Preferably the system further includes means to enable the submitter to increase the reward to the entity.

In a further aspect the invention consists in a method of providing information comprising the steps of providing material on a network, providing a request for information means to allow submission of a request by a submitter, and means to optionally provide an inducement to likely submitters or selected subgroup or subgroups of likely submitters to submit a query.

Preferably the inducement comprises a reward.

Preferably the inducement comprises a monetary reward.

Alternatively, the inducement comprises a reward having a non monetary value.

Preferably the service further provides means to enable the entity to charge a fee for response to a request for information.

Preferably the request for information means is provided by a clearing house or service provider.

Preferably the method further includes means to allow further inducements to be provided to the submitter of a request for information.

Preferably the network is the internet or a local area network.

Preferably the method further includes means to enable the submitter to increase the reward to the entity.

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

One preferred form of the invention will now be described with reference to the accompanying drawings in which,

BRIEF DESCRIPTION OF THE DRAWINGS

FIG. 13 is a page allowing further information to be provided to the service.

DETAILED DESCRIPTION OF THE INVENTION

One preferred form of the invention will now be described with reference to the accompanying drawings.

Figure 1:
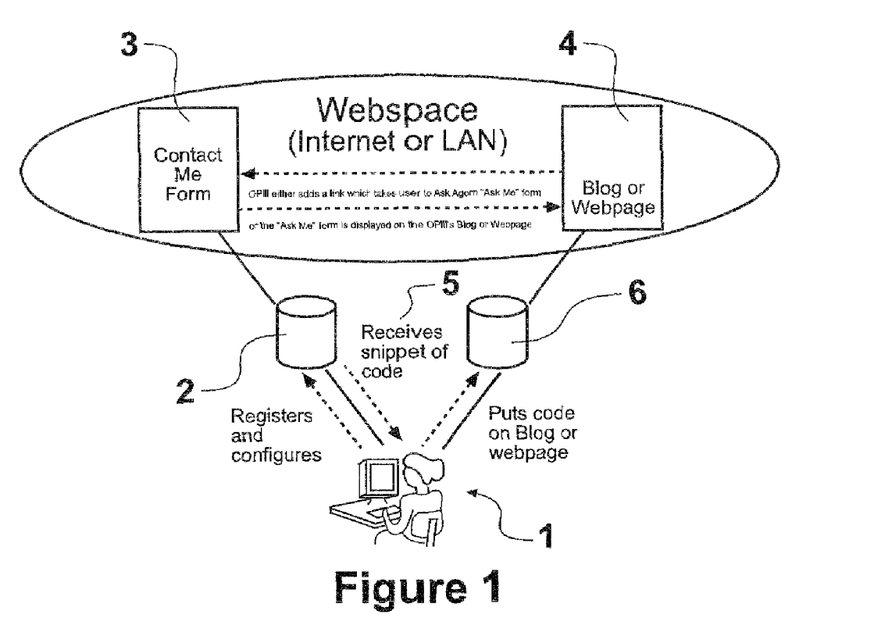
FIGS. 1-3 are flow chart indicating key elements of the invention.
Figure 2:
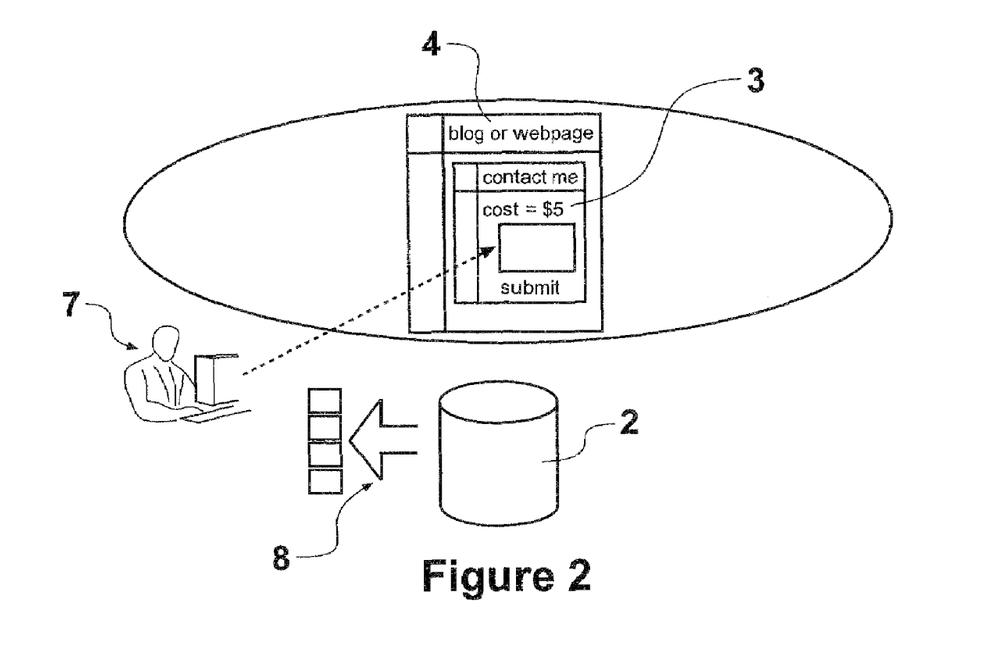
Figure 3:
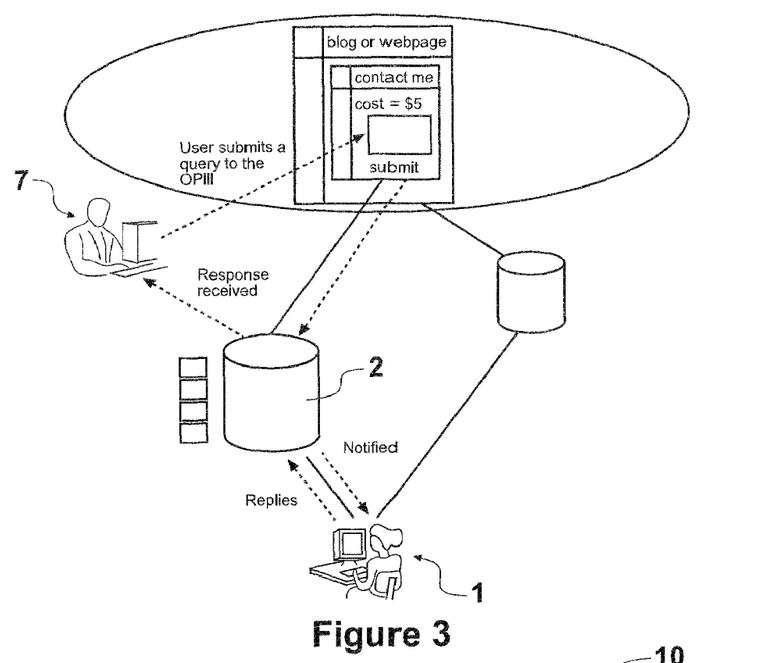

Referring to FIGS. 1, 2 and 3 an online publisher of information 1 registers and configures with a service provider 2. Through the service provider 1 a "contact me" form 3 is provided on a searchable database which is preferably a webspace such as the internet or a local area network. The contact form may be provided, for example, on a blog or a web page 4. The online information provider 1 may receive snippets of code at 5 and also places a code provided, for example, by the service provider 2 on to the blog or web page, for example, through server 6. The code is received when the online publisher of information has registered and configured their page. When the code is entered in, for example, the blog or web page either the "contact me" form 3 may be provided on the blog or web page or there may be a link from the blog or web page to the "contact me" form.

FIG. 2 shows the "contact me" form 3, as for example, a pop-up on the blog or web page 4. A user or potential request submitter 7 may visit the blog or web site page 4 and using the "contact me" form 3 may submit a query to the online publisher of information 1. The system is optionally able to provide a reward to the submitter of the request and this will be described further later but at least the service provider 2 knows the value of any reward which may be money, or a non monetary reward such as points, virtual currency, any other device having a value. The user 7 either has enough value to submit a query indicated in FIG. 2 at a cost of say $5, or must buy more, for example, through a credit card payment facility 8.

The user 7 then submits the query as indicated in FIG. 3 and the online publisher of information 1 can then respond to the submitter 7, either through the sever 2 or directly, for example, by email, and if it is desired can offer an inducement towards submitting further queries by providing a reward to the submitter 7.

Figure 4:
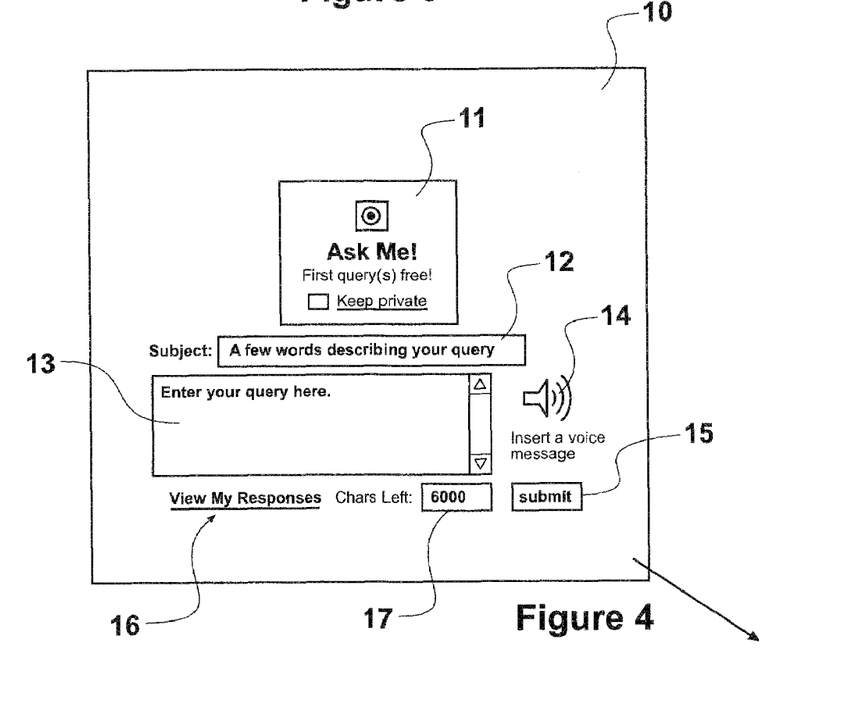
FIG. 4 is a representation of a pop-up box or page that can be used to solicit queries by using a preferred from of the invention.

FIG. 4 show a pop-up box 10 or alternatively the material can be provided on another page which enables a potential submitter of a query to contact die online information provider 1. The form 10 may have an information panel 11, a space for a subject at 12, and a space to enter the query at 13. An indication to allow a voice message can be provided at 14 along with a typical submit button 15.

A message allowing responses to be viewed can be provided at 16 and indication of available space at 17. This process will be described further hereinafter.

Figure 5:
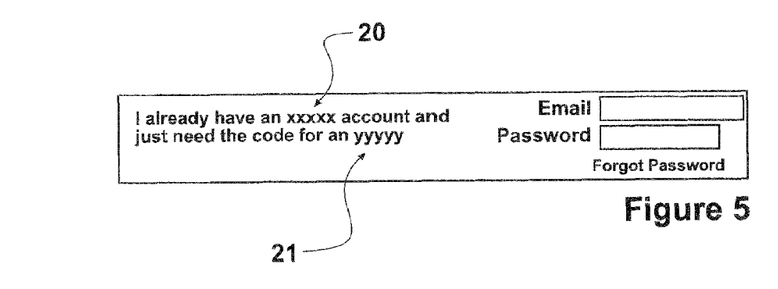
FIG. 5 is a log-on box usable in a preferred form of the invention by an online information provider, FIG. 6 indicates a possible registration form for use by an online information provider in the preferred form of the invention.
Figure 6:
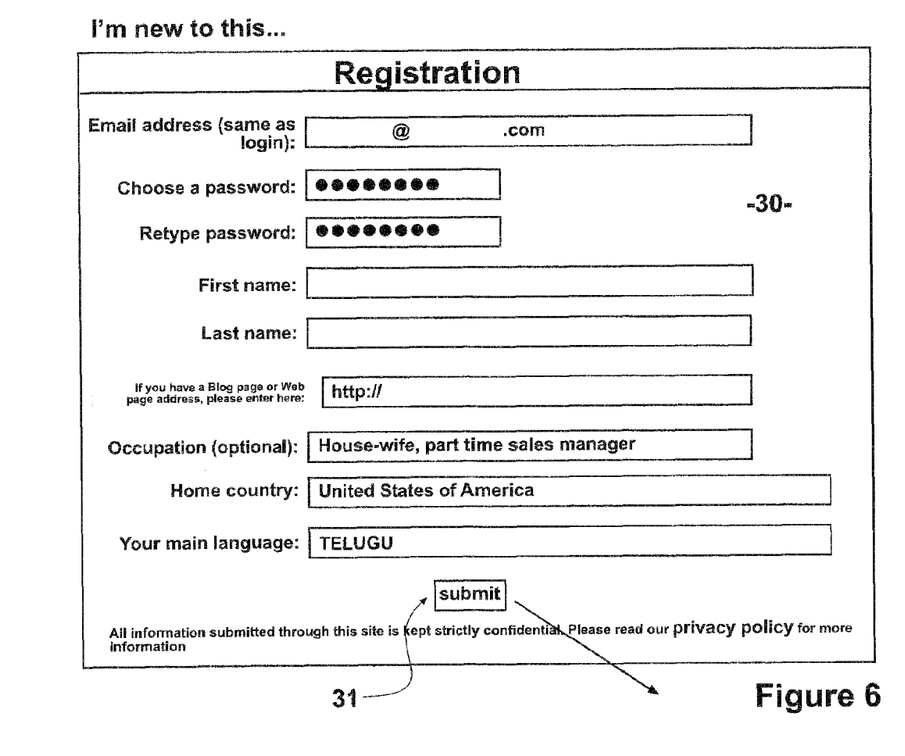

Turing now to FIG. 5, this allows an online information provider to access their account with the service provider indicated at 20 and indicate that they need a further code 21 for the system provided by the invention. Once the email and password are entered the online information provider is taken to form 30 indicated in FIG. 6 which seeks typical information such as email address, password, name information, optionally occupation, home country, and language.

Figure 7:
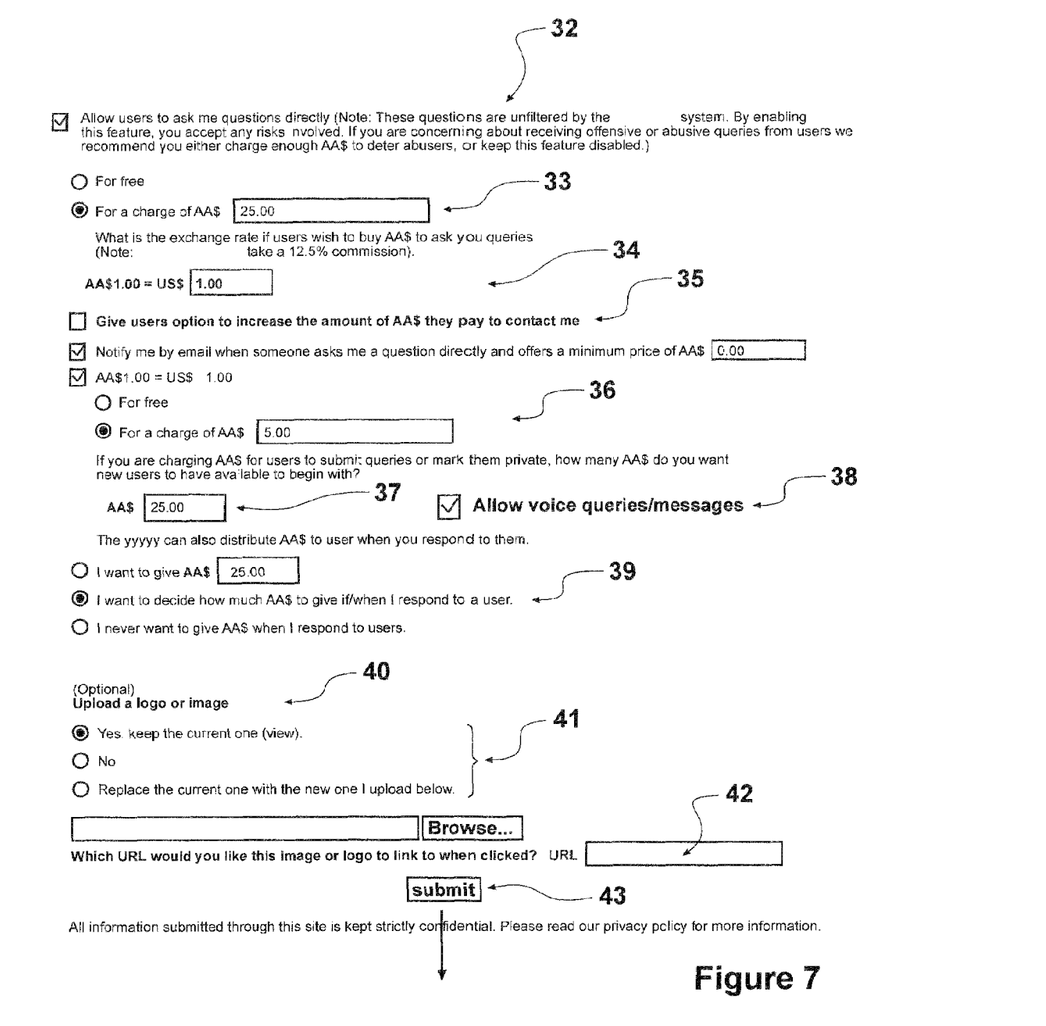
FIG. 7 shows a configuration chart usable in a preferred form of the invention to allow an on-line publisher of information to use to join the service.

Once the submit button 31 is pressed the online information provider is taken to form 32 indicated in FIG. 7, which allows the information provider to configure their service. Thus at 33 the option is provided to charge a fee for the response to a query (including a free option as indicated). At 34 there is an opportunity for the online information provider to indicate an exchange rate between the value of the inducement offered and for example, a currency such as United States dollars. At 35 an opportunity is provided which will allow a query submitter to increase their payment if desired, for example, to increase their priority in terms of receiving a response to their query. Panel 36 allows a privacy option, for example at an extra fee.

Panel 37 allows an initial inducement to submit queries to be provided to a user and 38 activates the voice query option.

39 indicates options in relation to the provision of an inducement to the user such as providing a reward at a standard amount, providing a reward selected by the online information provider, or never providing an inducement.

Optional features such as an uploading of a logo or image is provided at 40 or to change the image at 41.

The URL to which clicking the logo or image will lead can be entered at 42.

Figure 8:
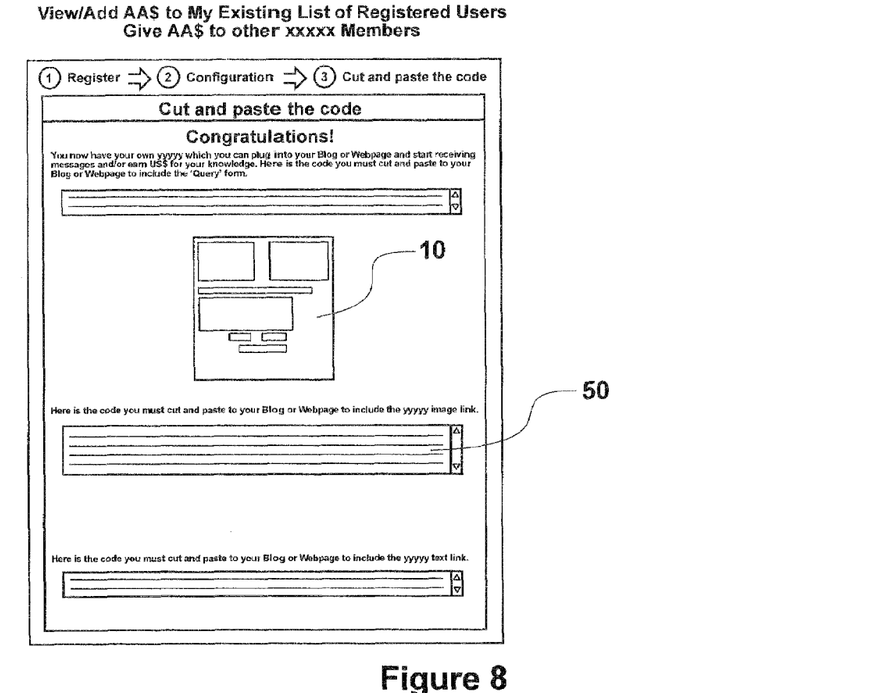
FIG. 8 shows indicates a code form usable to provide the service on, for example, a web page.
Figure 9:
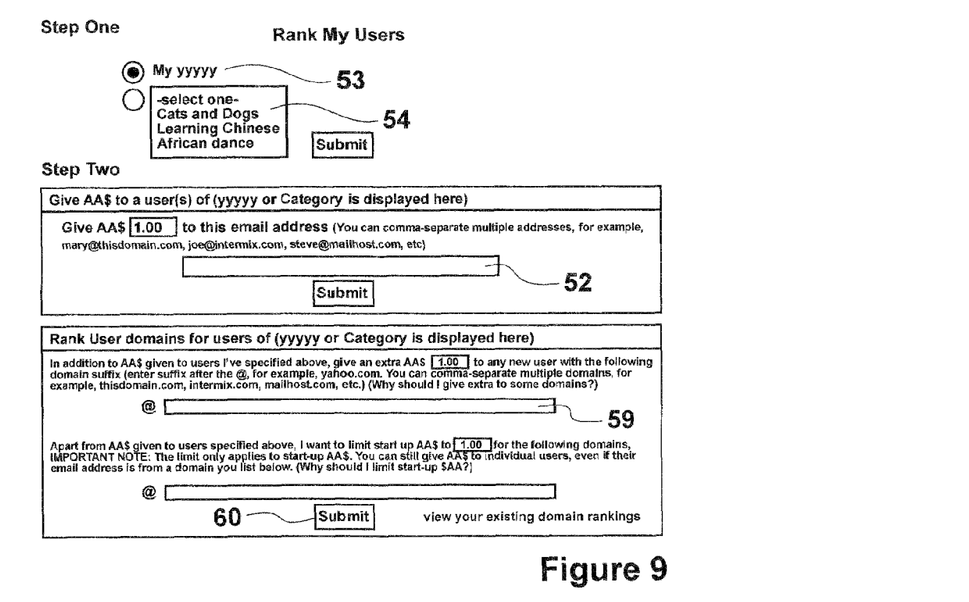
FIG. 9 shows diagrammatically, information that an online publisher of information may provide to the service provider to enable users to be ranked as to their value to the online information provider, FIG. 10 a further form useful in allowing users to be ranked, FIG. 11 a representation of an online publisher of information is possible email domain rankings, FIG. 12 indicates a further list of users to view or add to existing registered users.

Once the submit button at 43 is pressed the online information provider is taken to the material in FIGS. 8 and 9.

FIG. 8 is representative of a code provided by the surface provider 2 as at 50 and the panels in FIG. 9 allow further options.

The code at 50 is cut and pasted on to the blog or web site for example, of the online information provider and this will have the effect of causing the form of FIG. 4 to be displayed on the blog or website.

FIG. 9 commences the procedure for ranking users, that is to say, request submitters. Panel 51 allows an inducement to be provided to an email address entered at 52 and requests the questions be directed to the online service providers now set up page indicated as "yyyyy" at 53. If the online information provider has selected categories, these can then be displayed at 54.

Panel 57 allows uploading of multiple email addresses and panel 58 allows an inducement to be provided, for example, to users having a particular domain suffix entered at 59. When submit button 60 is pressed the online information provider is taken to the panel 63 indicated in FIG. 10, which also allows multiple email addresses to be uploaded and submitted by pressing submit button 64.

Figure 11:
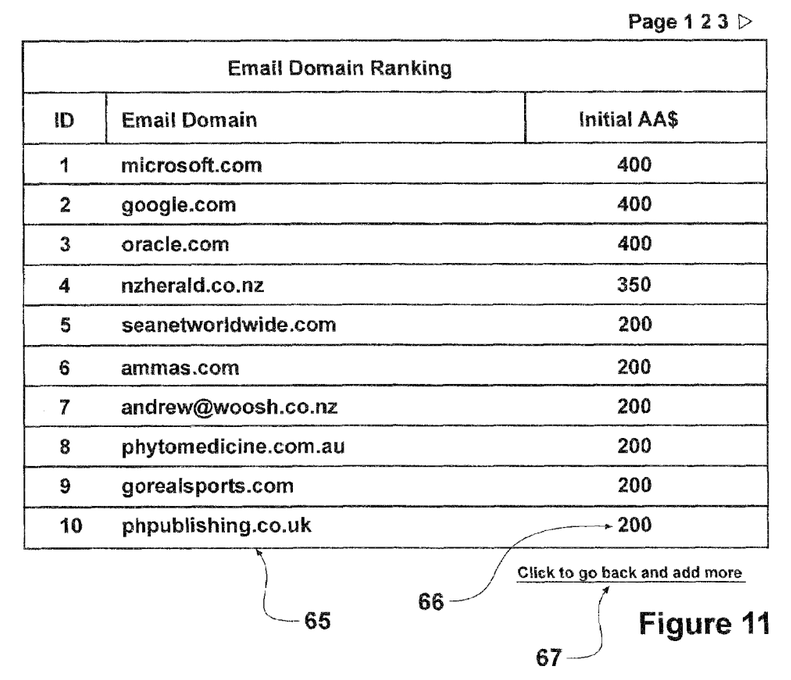

A user can click on a panel to view existing domain rankings to bring up the panel 65 shown in FIG. 11 where various email domains are indicated by way of example only.

Initial reward values are indicated at 66.

Figure 10:
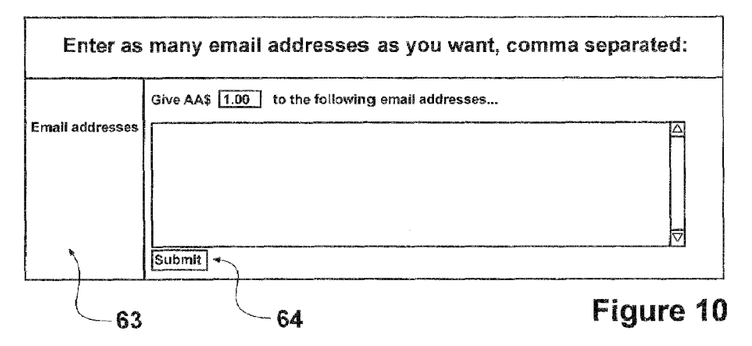

Clicking the wording at 67 takes the user back to the "rank my users" page indicated in FIGS. 9 and 10.

Panel 70 in FIG. 12 allows the online information provider to view or add to their existing list of registered users and again allows category selection at 71 if desired.

The construction at FIG. 12 allows further users to be entered at 72 with their email address at 73. Reward values standing to those that users credit indicated at 74 and in amounts to be given by way of inducement when those submitters submit a query as indicated at 75. The date the particular user first entered the online information providers service page may be shown at 76. Multiple pages are indicated at 77.

Figure 14:
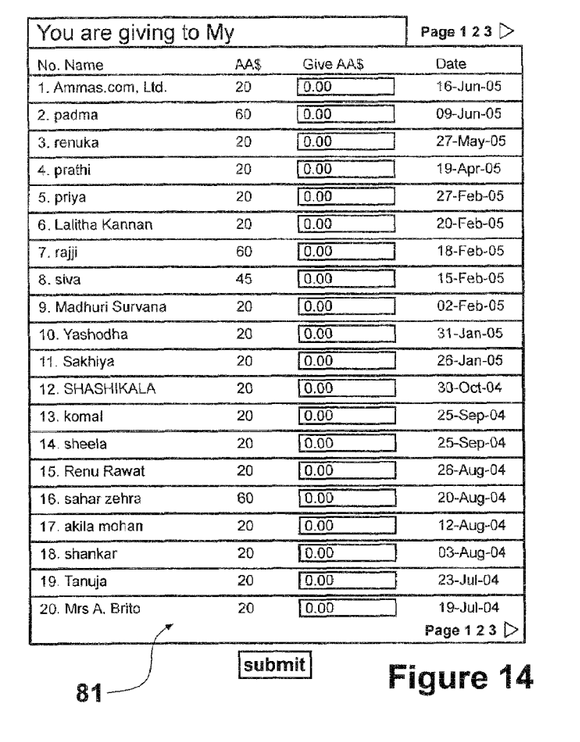
FIG. 14 is a page indicating inducements that can be given to people likely to submit requests.

If the online information provider selects to give rewards to other members of their system this material can be entered in panels 80 and 81 indicated in FIGS. 13 and 14.

Figure 15:
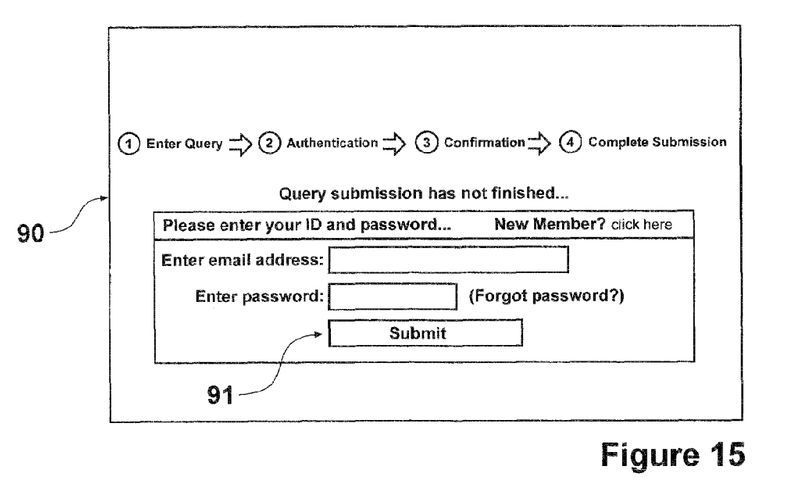
FIG. 15 shows a log-on form for a potential query submitter to use the service, FIG. 16 confirms that a query is to be submitted.

Panel 90 in FIG. 15 is panel usable as part of the query submitting system being the initial page that must first be entered.

Figure 16:
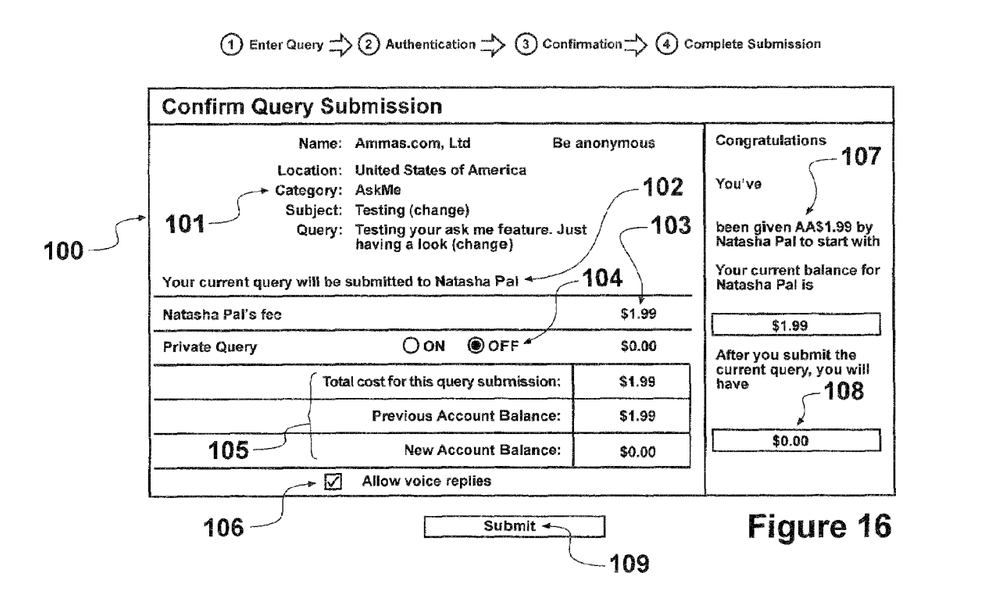

Pressing the submit button 91 takes the persons submitting the query to panel 100 shown in FIG. 16.

Options are indicated at 101 along with an indication to who the query is submitted to at 102. This is selected by the submitter. The online information provider's fee is indicated at 103 and the option for privacy indicated at 104.

Panels 105 show the state of the submitters account and also includes an option for voice reply at 106. Any initial inducement to submit a query is indicated at 107 and the account total after the query has been submitted is indicated at 108.

Once the submit button 109 is pressed the query is submitted.

Figure 17:
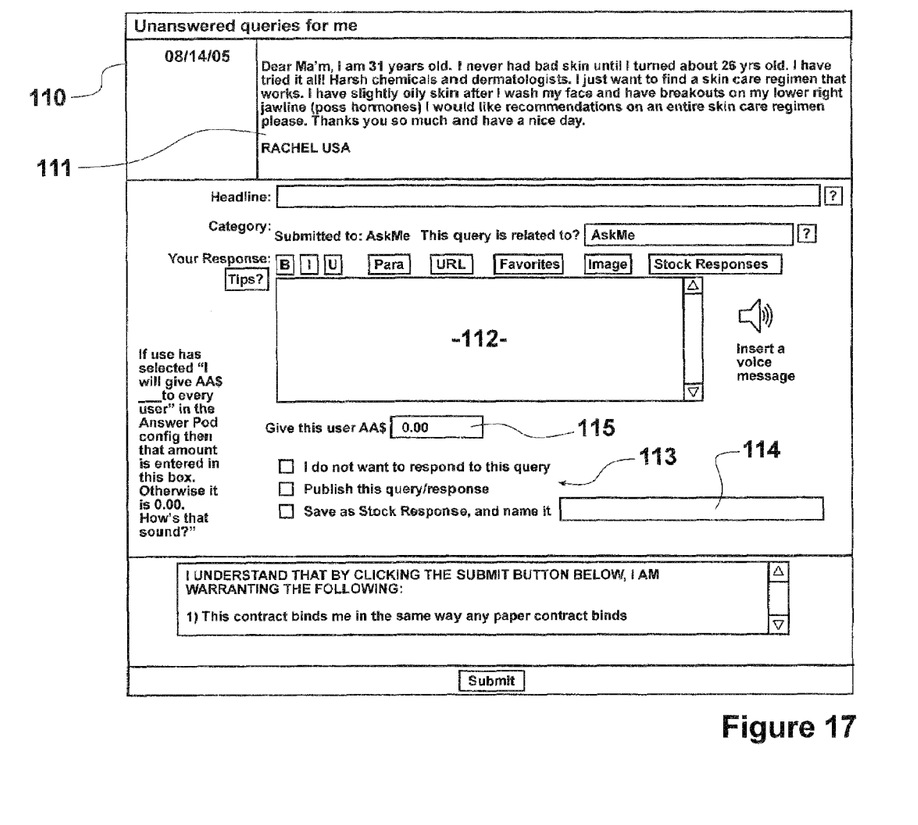
FIG. 17 is a form enabling a response to be made.

FIG. 17 indicates the reply panel or page 110 with the query indicated at 111 and the response at 112.

The responder's options are indicated at 113 such as not wishing to respond to the query, publishing the query and response, or saving as a stock response under a name indicated at 114.

The amount of any reward or inducement to the query submitter is entered at 115.

Thus it can be seen that an information service or a method of providing information is provided which has the advantage that the online information provider can be accessed through a blog or web page in a web space such as the internet or local area network. The system is of particular advantage as it allows an inducement to be offered to likely submitters, groups of submitters, or sub-groups of submitters to make a submission. This acts as a type of discount and can be offered to selected persons. The option to allow the submitter to increase their fee to elevate their priority is also desirable.

I claim:

1. An information service comprising:
   a network comprising at least one computer server,
   material on the network provided by an entity,
   a request for information means, for submission of a request for information by a submitter to the entity, the request for information means being provided by the network or being linked to the network, the request for information means being computer based,
   means by which the entity passes the request for information to an information provider,
   means for the information provider to provide an inducement selected by the information provider to the submitter, to likely submitters, and to selected subgroup or subgroups of likely submitters to submit the request for information, and
   means for the entity to receive submitted requests for information.

2. An information service as claimed in claim 1 wherein the inducement comprises a reward.

3. An information service as claimed in claim 1 wherein the inducement comprises a monetary reward.

4. An information service as claimed in claim 1 wherein the inducement comprises a reward having a non monetary value.

5. An information service as claimed in claim 1 wherein the request for information means is provided by a clearing house or service provider.

6. An information service as claimed in claim 1 wherein the information provider can provide further inducements to the submitter of a request for information.

7. An information service as claimed in claim 1 wherein the network is the internet or a local area network.

8. An information service as claimed in claim 1 wherein the system further includes means for the entity to increase the inducement to the submitter.

9. An information service of claim 1, wherein the inducement is a reduction in the fee charged for the response to the request for information.

10. The information service of claim 1, further comprising means for the entity to charge a fee for a response to the request for information, and
    wherein the means for the information provider to provide an inducement provides an inducement selectively to each of the group consisting of i) the submitter, ii) the likely submitters, and iii) the selected subgroup or subgroups of likely submitters to submit the request for information.

11. A method of providing information comprising the steps of:
    an entity providing material on a network via a computer server,
    providing a request for information means to allow submission of a request by a submitter to the entity, the request for information means being computer based,
    the entity passing the request for information to an information provider and the information provider providing an inducement selected by the information provider to likely submitters or selected subgroup or subgroups of likely submitters to submit requests for information, and
    the entity receiving the request for information from the submitter.

12. A method as claimed in claim 11 wherein the inducement comprises a reward.

13. A method as claimed in claim 11 wherein the inducement comprises a monetary reward.

14. A method as claimed in claim 11 wherein the inducement comprises a reward having a non monetary value.

15. A method as claimed in claim 11 wherein the request for information means is provided by a clearing house or service provider.

16. A method as claimed in claim 11 wherein the method further includes means to allow further inducements by the information provider to be provided to the submitter of a request for information.

17. A method as claimed in claim 11, comprising the further step of the entity increasing the inducement to the submitter or submitters.

18. The method of claim 11, wherein the inducement is a reduction in the fee charged for the response to the request for information.

19. The method of claim 11, wherein,
    the entity charges a fee for a response to the request for information, and
    the step of the information provider providing an inducement provides an inducement selectively to each of the group consisting of i) the submitter, ii) the likely submitters, and iii) the selected subgroup or subgroups of likely submitters to submit the request for information.

* * * * *